TIME-DIVISION TELEPHONE EXCHANGE SYSTEM HAVING A VARIABLY SPACED REPETITIVE SAMPLING RATE

Original Filed March 23, 1965

INVENTORS
NOBUHIKO SHIAMASKI
JIRO OKUDA
BY
OSTROLENK, FABER, GERB & SOFFEN
ATTORNEYS

INVENTORS
NOBUHIKO SHIMASAKI
JIRO OKUDA
BY
OSTROLENK, FABER, GERB & SOFFEN
ATTORNEYS

TIME-DIVISION TELEPHONE EXCHANGE SYSTEM HAVING A VARIABLY SPACED REPETITIVE SAMPLING RATE
Original Filed March 23, 1965 3 Sheets-Sheet 3

INVENTORS
NOBUHIKO SHIMASKI
JIRO OKUDA
BY
OSTROLENK, FABER, GERB & SOFFEN
ATTORNEYS

United States Patent Office 3,478,171
Patented Nov. 11, 1969

1 2

3,478,171

TIME-DIVISION TELEPHONE EXCHANGE SYSTEM HAVING A VARIABLY SPACED REPETITIVE SAMPLING RATE

Nobuhiko Shimasaki and Jiro Okuda, Tokyo, Japan, assignors to Nippon Electric Company, Ltd., Tokyo, Japan Continuation of application Ser. No. 441,980, Mar. 23, 1965. This application Jan. 10, 1969, Ser. No. 797,325
Int. Cl. H04j 3/12
U.S. Cl. 179—15 6 Claims

ABSTRACT OF THE DISCLOSURE

This disclosure broadly teaches a time-division multiplexing system for connecting calling and called parties within a switching network in which the available paths and available time slots between calling and called parties are examined for each time slot during a time interval commonly referred to as the guard time with the flexibility of the system enabling the connection between calling and called party to occupy time slots which are spaced from one another by non-constant intervals.

This invention relates to a time-division telephone exchange system, and is a continuation in part of copending application Ser. No. 104,156 filed Apr. 19, 1961, now abandoned entitled Time Division Telephone Exchange System.

The objects and operation of the time-division telephone exchange system of the invention will be best understood from the following description of exemplifications thereof, reference being had to the accompanying drawing, wherein.

Figure 1:
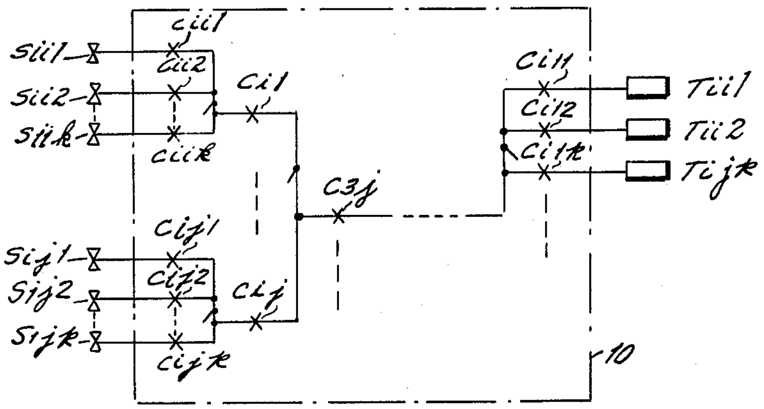
FIG. 1 is a schematic diagram showing an example of the general construction of the time-division telephone exchange network of the present invention.

In FIG. 1, which is a schematic diagram showing an example of a time-division telephone exchange network, the part enclosed by the dash-line 10 is an exchange network, to which are connected subscriber lines S*iii* to S*iik* and S*iji* to S*ijk*, and trunk lines T*iii* to T*ijk*, respectively. The exchange network 10 has connected therein in a conventional way, the time-division contacts. C*iii* to C*ijk* are time-division contacts which are connected directly to an outgoing subscriber terminal and which connect, at each successive time slot repeatedly at a predetermined sampling frequency, the external circuits S*ijk* or T*ijk* with the exchange network in accordance with a sampling frequency during the period that the subscriber or the trunk line corresponding to the external circuit, is in use. If there are differences between the signal transmission systems of the external circuits and the exchange network, it is to be understood that translating or converting circuits (modulating and demodulating circuits, for example, voice-PAM, voice-PCM) are further provided. C*ij* are multiplex or multiple time-division external contacts which are indirectly connected to the external circuits, and by closing their contacts as indicated at one or more time slots, they can be simultaneously and commonly connected to and used for a plurality of connecting channels between the external circuits. These contacts will be called multiplex hereinafter. Also, as in the case of C*ijk* contacts, translating conversion circuits may further be provided, for example, PAM-PCM.

In the suffixes of C*ijk* and C*ij*, the first suffix *i* corresponds to the number of the connecting step-state, the second suffix *j* distinguishes the contact or the contact group (in the case of C*ijk*) which belongs to the same connecting step, and the third suffix *k* is the number corresponding to a group of inlets or outlets over which the time-division multiplex signals are spread by being separated from one another by the respective time-slots. Stated in another way, suffix *k* is a number corresponding to a group of inlets and outlets over which time-division multiple signals are passed to separate only one time slot, the maximum *k* number K being the maximum number of time-division channels.

In a modification of this exchange network, by making the number of time-slots in excess of the number assigned to C*ijk* on the subscriber S*ijk*, the sampling frequency can be increased; i.e., to each contact C*ijk* on the side of the subscriber's S*ijk*, there is allotted a plurality of time slots for increasing the sampling frequency. Also, a plurality of time slots can be allotted to the contacts C*ijk* on the side of the trunk lines T*ijk*, to make them multiplex contacts, so as to use the trunk lines themselves in a time-division manner, or as a time-division system. Also, in cases in which time-slots are fixedly assigned to certain contacts, such telephone exchange system has to have contacts which operate with variable time-slots.

The time-division exchange network is generally arranged in the manner shown in FIG. 1. The contacts C*ij* and C*ijk* are closed by the allotted pulses or pulse of the time-slots allocated thereto, and if a new connection is required, the time-slot is further assigned to the contacts which are needed for the connection. After the end of a call, the time-slots for a series of the contacts used in the call, are cancelled. In such systems, the telephone exchange network operates through closure of contacts C*ij* and C*ijk* by the application of predetermined time-slot pulses, and by supplying contact positions of the time-slot pulses when new connections are required, and, upon completion of the telephone call, the allocation of the time-slots to such contacts is re-set.

Figure 2:
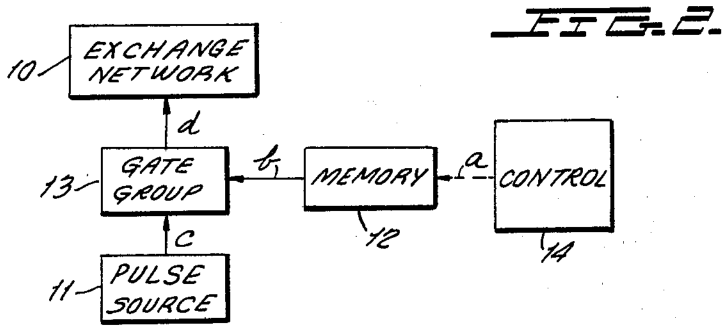
FIG. 2 is a basic block diagram of an example of a conventional time-division exchange system.

FIG. 2 is a basic block diagram in which 10 represents the exchange network 10 of FIG. 1, 11 is a pulse source for generating pulses corresponding to each time-slot, 12 is a memory equipment means for remembering or retaining a condition corresponding to the pulses of the time-slots which are assigned to each contact in the exchange network 10, 13 is a gate group of gate circuits for sending the proper pulses from the pulse source 11 through circuit channel or route *c* to proper contacts in the exchange network 10 through routed, under the control of signals sent from the memory equipment means 12 to gate group 13 through circuit channel or route *b*, and 14 is a central control equipment means of the switchboard for setting (and thereafter resetting) the time-slot assignment in the memory equipment 12 through a circuit channel or route *a* from Control 14.

In the system shown in FIG. 2, the functions of the central control means 14 correspond to the set and re-set operations of known memory devices. When the set operation is once completed, the central control part 14 of FIG. 2 does not participate in and is not related to the operation of the established communication channel, until the re-set operation occurs, as this central control part continues to await the next call and further continues to scan the subscriber lines, the trunk lines, and changes the contents of the memory system in a manner corresponding to the respective scanned subscriber and trunk lines. In such known systems, therefore, the central control part operates exclusively for setting and resetting the memory equipment means 12.

As the decrease of the total number of contacts by the multiple use of contacts and the decrease of the number of contacts per one speech channel, which constitute the advantage of such time-division exchange system, are obtained by the storage of calling conditions in a memory device, the memory device unit must have a correspondingly large signal storage capacity. This can be readily seen by considering the time-slot appointed or withdrawn by one of K in $Cijk$ in FIG. 1, or by maximum K in number K in $Cij$ in FIG. 1, as when one time-slot is assigned to or withdrawn from the memory means 12 by one of the K contacts $Cijk$ of FIG. 1, or by the maximum K of contacts $Cij$ of FIG. 1. In conventional memory systems, the time-slot conditions for every contact are memorized, for example, either by the method in which delay line memories are employed in the memory means, or by making the memory means memorize directly or in coded form, the entire existing pattern of the assigned time-slots for all contacts.

It is among the objects of the invention to provide an exchange system of the type described above, which will provide all its desirable features, with memory means of smaller capacity than heretofore required. This is achieved by memorizing the time-slot through which a speech channel has been completed between external circuits.

Figure 3:
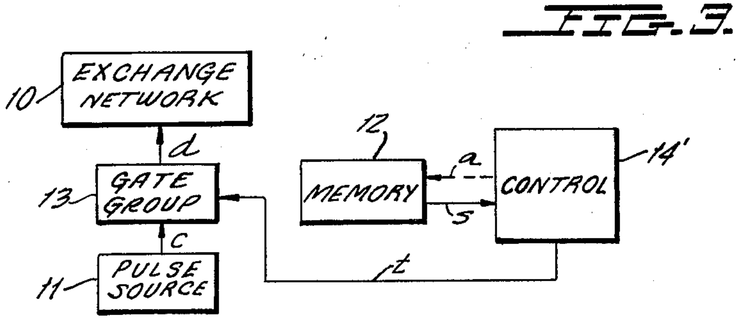
FIG. 3 is a basic block diagram of an example of the time-division exchange system of the present invention.

FIG. 3 is a basic block diagram of an example of the time-division exchange system of the present invention, wherein 10, 11 and 12 constitute the same system elements as employed in the conventional system of FIG. 2. However, in the system of FIG. 3, the Control circuit 14′, although analogous to that of FIG. 2, has two functions. The first function of the control part 14′ of FIG. 3, is to identify the calling party and the called party and to determine the class of service to be performed, by testing the called party line, the free trunk line, the line connection route, the usable time-slots, or the like, and to store through route *a* in the memory equipment 12, memory elements of the positions of the calling and called parties (or the trunk line), the time-slot to be used, and the class of service. The resetting of the memory equipment 12 at the termination of the call, is also a part of this first function of the central control part 14′ of FIG. 3. The second function of the system element 14′ of FIG. 3 is to determine, subject to the control of the memorized contents of the memory equipment 12, the contacts of the exchange network 10 that are necessary for each of the calls, and the time-slot that is to be used, to cause establishment of the determined connections so that no cross-connection will occur among many calls using the same time-slot, and correspondingly control the group of gate circuits 13 through routes *s* and *t*.

According to the present invention, it is sufficient for purposes of a single call, to make the control part 14′ of FIG. 3 perform the first function, once at the setting and again at the resetting, and to perform the second function once at each sampling frequency during the call. The second function of the control means 14′ allows the use of memory means 12 of materially reduced storage capacity while enabling the exchange system 10 of the invention to perform all functions of the heretofore known systems of this type which normally required memory means of considerably larger capacity.

The second function of the central control part 14′ of FIG. 3, will now be explained in greater detail. The calls (including the connection to the register trunk, tone trunk, etc.) are assumed to be *m* in number, and are designated S1, S2 . . . S*m*. There is, of course, a maximum M of *m*, and *m* is equal to or less than M. Also, the K time-slots are counted as 1, 2, . . . *k*, . . . K, and the repeated pulses of a time-slot are counted as 1, 2, . . . *l* from a predetermined time point. Thus, the time-slots T are identified by affixing thereto the former counting as the first suffix, and the latter counting as the second suffix. The sequence of the individual time slots is therefore as follows:

$$\underbrace{T_{11}, T_{21} \ldots T_{k1}}_{\text{K in number}},\ \underbrace{T_{12}, T_{22} \ldots T_{k2}}_{\text{K in number}},\ \underbrace{T_{11}, T_{21} \ldots T_{kl}}_{\text{K in number}}$$

Figure 4:
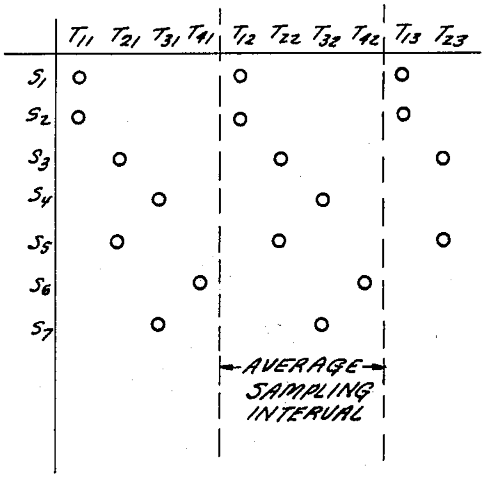
FIGS. 4 and 5 show the relationship between the time slots and calls of FIGS. 2 and 3, respectively.

In the conventional exchange system shown in FIG. 2, applying the above-mentioned notations, the relation between the call S to be treated and the time slot T, is shown in FIG. 4, wherein the intervals of the sampling points of a single call are constant. In the present invention, the central control part 14′ of FIG. 3, closes contacts $Cijk$ at $T_{11}$, based on the information stored in the memory equipment means 12 about the combination of two (or more) external circuits for the first call $S_1$, so as to perform the necessary and sufficient assignment of contacts. Similarly, Control 14′ of FIG. 3 receives from the memory equipment 12, information concerning the second call $S_2$, and performs the necessary and sufficient assignment of contacts. It is to be noted, however, that the contacts assigned for $S_1$ are then blocked, so that no cross-connection will occur. Thereafter, the contacts are assigned for call $S_3$ and then for successive calls $S_4$, $S_5$ . . . . If any call comes in link-blocked during such assigning, the blocked call is skipped over for further treatment by another time slot, and the next succeeding call is treated as described above. After the contacts have thus been assigned for $P_{11}$ calls, the output of the pulse source 11 is controlled by the gate 13 at $T_{11}$ in accordance with the whole pattern of the assigned contacts, and the pulses are supplied to the exchange network 10. Here, the number of calls for which the contacts are assigned at $Tij$ are assumed to be $Pij$.

During the action of $T_{11}$ or immediately before the action of $T_{21}$, the contacts are assigned for calls S of $P_{21}$ which were not treated at $T_{11}$ (including those which were skipped over at $T_{11}$ on account of the link block during the performance of the central control part 14′), successively in the manner described, so as not to cause cross-connection and skipping-over of the call which again comes link-blocked. The outputs of the pulse source 11 are controlled by the gate 13 at $T_{21}$ in accordance with the pattern of the contacts assigned for the call S of $P_{21}$ in number, and the pulses are supplied to the exchange network 10.

Repeating these actions, calls S of $P_{31}$, $P_{41}$ . . . $P_{k1}$ in number, are allocated to $T_{31}$, $T_{41}$, . . . $T_{k1}$, respectively; the contacts are assigned by the central control part 14 according to the information contained in the memory equipment means 12 about S; and then the pulses for the control are supplied through the gate 13 from the pulse source 11 to the exchange network 10. Here, it must of course be noted that $$P_{11}+P_{12} \ldots +P_{k1}=m$$

wherein *m* is the total number of the calls S to be treated, as has been described above.

Next, all calls S at $T_{12}$, $T_{22}$ . . . $T_{k2}$ are divided into groups of $P_{12}$, $P_{22}$ . . . $P_{k2}$ in number, and assigned with the time slots and the contacts, in the same manner as in $T_{11}$, $T_{12}$ . . . $T_{k1}$. In this case, of course, $$P_{12}+P_{22} \ldots +P_{k2}=m$$

Similarly, calls are divided for groups of K time slots, or ($T_{13}$, $T_{23}$ . . . $T_{k3}$) . . . ($T_{11}$, $T_{21}$ . . . $T_{k1}$), . . ., so that $$P_{11}+P_{21}+ \ldots +P_{k1}=m$$

Figure 5:
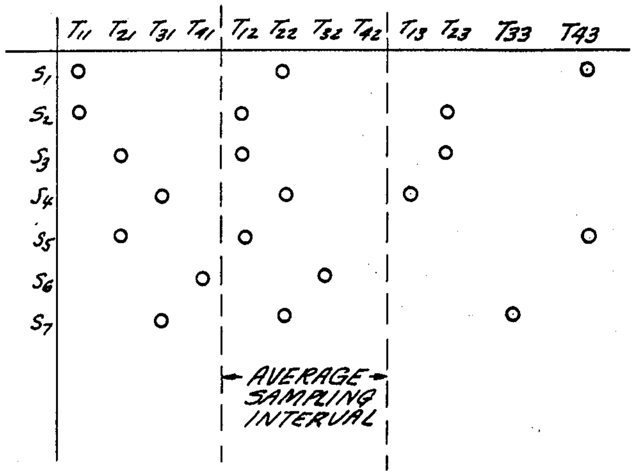

In this manner, a call ($S_1$, for example) is assigned with time slots, one from each of the time slot groups ($T_{11}$, $T_{21}$ . . . $T_{k1}$), ($T_{12}$, $T_{22}$ . . ., $T_{k2}$), . . ., ($T_{11}$, $T_{21}$, . . . $T_{k1}$), . . . which consists of K time slots, respectively. As shown in FIG. 5, the assigned time slots for the call $S_1$, for example, are not in the same manner as $T_{11}$, $T_{12}$ . . ., $T_{1l}$ as in the conventional system, but as $T_{11}$, $T_{22}$, $T_{43}$ . . . $T_{kl}$, for example, wherein the second suffixes of T are in the order of 1, 2, 3, . . . and the first suffixes are not always the same, so as to supply pulses which are necessary for the call and which will never cause cross-connection, to each contact of the time-division exchange network.

In this manner, the sampling of each call is performed not at a completely constant time interval, but from the statistical point of view, at a constant time interval in the "average", with the result that the calls are correctly transmitted. Although there are extreme cases, such as when the time intervals between the neighboring sampling points incessantly vary in large amount, the sampling period would be substantially twice the mean value and the transmission characteristics would be adversely affected, such cases occur very rarely. The calls $S_1$, $S_2$, . . . $S_m$ can be divided into some minor groups, $$(S_1, S_2 \ldots, S_p), (S_{p+1}, S_{p+2} \ldots S_g) \ldots, (S_{r+1}, S_{r+2}, \ldots, S_m)$$

(where $1 \leqq p < g < r < m$), and the time slots $k$ in number can be divided into $$(T_1, T_2, \ldots T_u), T_{u+1}, T_{u+2}, \ldots T_v), \ldots (T_{w+1}, T_{w+2} \ldots T_k)$$

of the same number (where $1 \leqq u < v < w < k$, so that there are one-to-one correspondences between the minor groups of S and T, and the individual combinations of T and S may be made in the corresponding groups. Also such combinations of the minor groups may be varied at far longer time intervals than the sampling period. For an extreme case, each time slot T can be fixed by allocating it to each call S. Even then the allocation of the time slot may be varied at far longer time intervals than the sampling period.

At any rate, in the system of the invention described above in connection with FIG. 3, suitable choice of the allowable maximum number M of the calls and the allowable maximum number of instantaneous, simultaneous communications (the maximum of $P_{kl}$), or the allowable frequency of the trial connections by the central control part 14' at a time slot $T_{kl}$ in relation to the number of channels, trunk lines and time-division networks to be treated, will make it possible to treat each call without any appreciable variation of the transmission characteristics and with so few troubles caused by the link block, that it can be statistically ignored. By thus allowing the momental or slow variation of the time slot for each sampling point of a call, a busy condition caused by the link block for a new call can be partly reduced by changing the allocation of the time slots for a portion of the calls that are taking place at that time.

A modification of the embodiment described above, will now be explained. If the traffic is small and the calls $S_1$–$S_m$ were treated when the allocation of connection by the central control part 14' initiated at $T_{11}$ has arrived at $T_{kl}$, where $$P_{11}+P_{21}+ \ldots +P_{kl}=m,$$

and if the allocation of connection is initiated from $S_1$ at $T_k+1$, 1 to allocate the succeeding sampling point, then it follows similarly that $$P_{11}+P_{21}+ \ldots +P_{kl} \approx m \approx M$$

when the calls are very frequent, while it follows that the sampling period not only varies but also is short when the calls are not frequent.

Alternatively, the exchange system can be so designed that when it is excessively heavily loaded, the average sampling period may become longer than the standard value, with a view to maintaining severe restrictions imposed upon the quality of the transmission characteristics. In such case, the time slots will once be allocated to each of all the calls after treatment initiated at $T_{11}$ for ($S_1$, $S_2$, . . . , $S_m$) has successively progressed but has not yet finished before $T_{kl}$ on account of the large value of $m$, and has progressed into $T_{21}$, $T_{22}$ . . . . This shows that the quality of the call depends on the quantity of the traffic (the frequency characteristics, for example, are dependent upon the sampling frequency), and means an increase in the freedom of design of an exchange network. Of course, it is possible to effect a sort of preferential treatment, without lowering the transmission quality of all the calls, so that the standard sampling period is always maintained for the calls whose quality must not be adversely affected (as by adding in the memory equipment 12, marks to the S thereof). This means addition of a rank to the service, which rank is not necessarily two classes.

By the second function of the control means 14', described above, the function of the memory equipment 12 of the conventional time-division exchange systems, is greatly reduced, and it makes possible also, to provide flexibility of the time-slot allocation and variation of the means sampling period, which have never been possible with conventional systems. Also, the exchange network can be made simpler for treating a given number of external circuits and traffic, by proper consideration of the factors of the traffic and transmission quality. The speed of the central control part 14' must be sufficiently high so that the duration of its second function shall be shorter than $T/N.K$ seconds for each sampling period of a call, where the standard sampling period of the time division is T-seconds, the standard multiplicity is K, and the maximum frequency of tests for the simultaneous connection in a time-slot is N.

Figure 7:
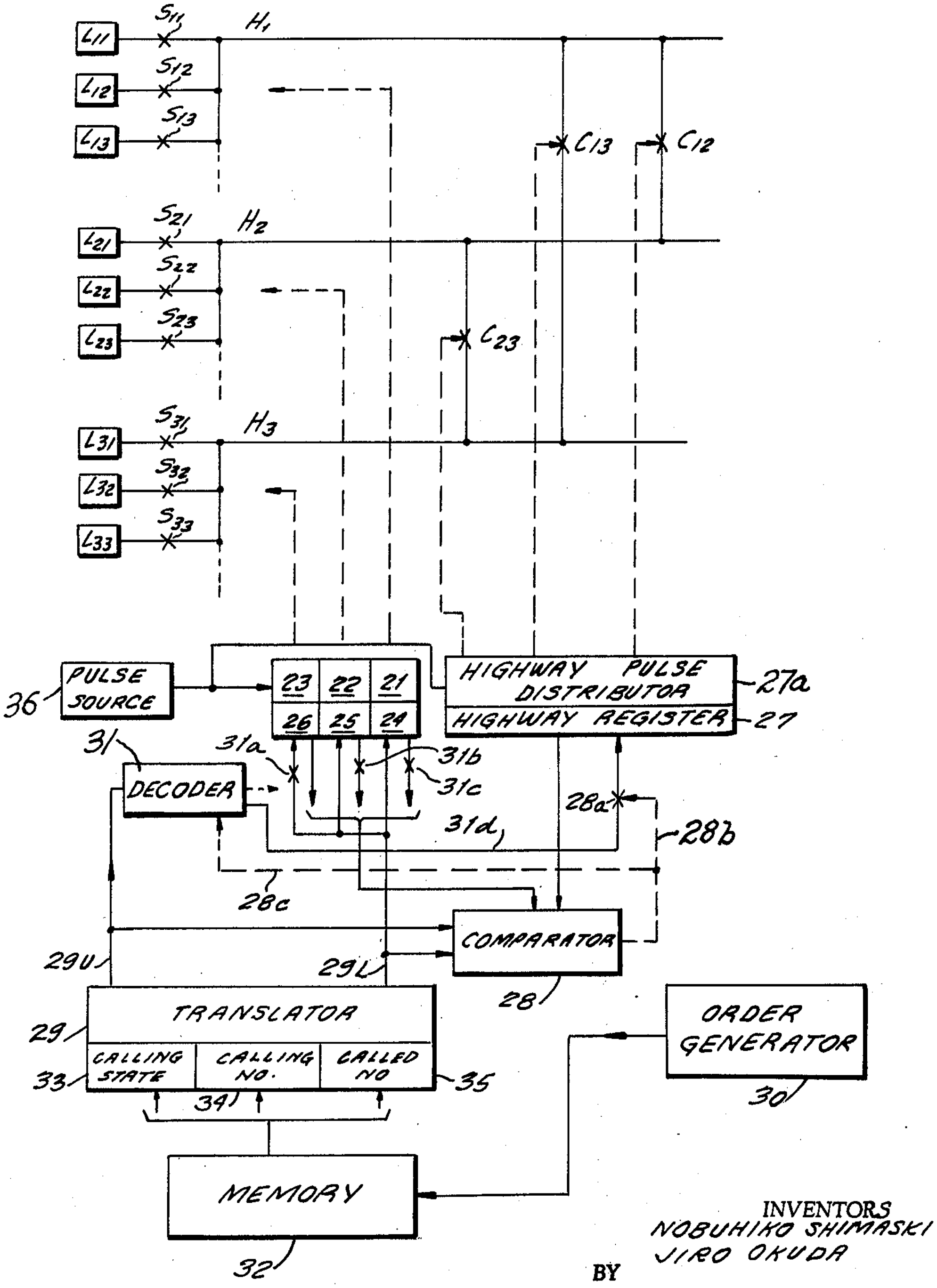
FIG. 7 shows a block diagram illustrating more in detail the operation of the central control part according to this invention.

Referring to FIGURE 7, L11, L12 through L33 denote external circuits (such as subscriber circuit, trunk line apparatus, or signal source), respectively, for connection to time-divisional highways H1, H2, H3 . . . through time-divisional switches S11, S12, . . . S33.

The first subscripts of L and S correspond to the highway number (subscript) while the second subscripts correspond to the ordering numbers of a group of external circuits belonging to a highway H.

The external circuit group is so designed as to realize a prescribed grade of service depending on the highway multiplicity and the originating and terminating traffic of the external circuits.

C13, C12, C23 . . . denote interhighway time-divisional switches. It is assumed here that the system constitutes a two-wire time division exchange network and a suitable external circuit state detection facility has been provided in the system, although it is omitted for brevity from the illustration. These parts correspond to a detailed representation of the contents of the exchange network 10 shown in FIGURE 3.

21, 22 and 23 denote pulse distributing circuits, respectively, for controlling switch groups belonging to H1, H2 and H3, respectively.

In accordance with the addresses of switches in each group which have been set in registers 24, 25 and 26 indicated below circuits 21, 22 and 23, either zero or one switch is marked from each group while the output of pulse source 36 controls pulse distributing circuits 21–23. These pulse distributing circuits 21, 22 and 23 correspond to gating circuit 13 in FIGURE 3. The central control part is comprised of highway register 27, comparator 28, translator 29, order generator 30 and decoder 31.

Now let it be required to describe the second class function for marking each of these switches just prior to each time slot in accordance with the contents of memory 32. The first class function for up-dating the contents of memory 32 in accordance with origination, progress and termination of calls is not new in the technique and hence, the description therefore is omitted here for brevity.

The memory circuit 32 memorizes the calling state in the form of "whichever two subscribers are engaged."

The state of a call is read out into the translator 29 under the control of order generator 30 just before one time slot causes the highway switches to operate. By "just before" as herein used is meant, for example, the pause or the guard time for pulse operation of the highways. In other words, the second class function regarding the next pulse operation takes place during the preceding guard time.

The blocks 33, 34 and 35 in translator 29 denote storage locations wherein information on the calling state, originating external circuit No. and the terminating external circuit No. enter, respectively. As a result, the external circuit addresses upper digit places U and lower digit places L emerge from translator 29 as the translator ouputs 29U and 29L. Originating and terminating addresses need not emerge simultaneously from translator 29.

Now let 29U be the output information indicating the highway to which the external circuit belongs. Then registers 24–26 for driving pulse distributors 21–23 respectively, are connected to output 29L through the output of decoder 31 which operates to selectively close switches 31*a*–31*c* thereby selecting the proper highways.

When switches S11 through S33 are selectively operated, information on "which two highways a call is handled on" is obtained as the output 31*d* of the decoder 31, setting highway register 27 and operating highway pulse distributing circuit 27*a* to cause interhighway switches C to selectively operate. This information is stored in highway register 27. Thus the designation of one time slot per one call becomes possible, although a plurality of calls are normally handled by one time slot. In the present exemplary case, three highways are provided to handle a maximum of two calls per time slot, but it should be understood that a greater or lesser number of highways may be employed, if desired.

With an increase in the number of highways, the number of calls that can be handled can be increased.

When registers 24, 25 and 26 regarding the first call have been set, the second call state is read out from memory 32 to translator 29 in the same manner as mentioned previously to set these registers.

In this case, a comparison is made in comparator 28 between switch assignment information that has been set into the registers and the translator 29 output (29U and 29L) to prevent occurrence of a double connection during the same time slot. This is performed by comparator 28 opening switch 28*a* through connection 28*b*, and disabling decoder 31 through connection 28*c*.

Figure 6:
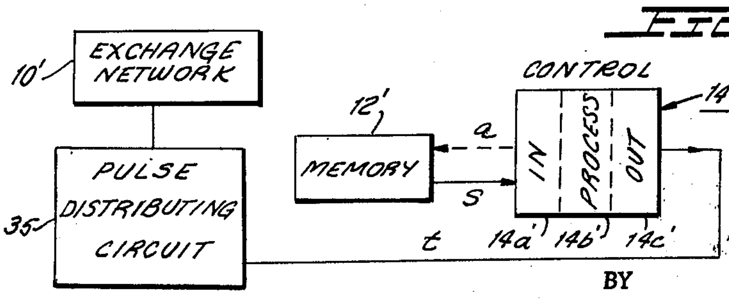
FIG. 6 shows a basic block diagram illustrating a modification to the example of FIGURE 3.

Since the block diagram of FIGURE 6 indicates a two-state connection system, the call cannot realize connection in the time slot under consideration, if congestion takes place at C12, for example. In such a case, the call is handled once more in the next time slot. In such a manner, it becomes necessary to determine switch contacts assignment information in succession so as to prevent occurrence of congestion and to supply a pulse regarding a time slot to the switching network through pulse distributing circuits 21–23 and 27*a* when registers 24–27 have been sufficiently occupied. In the next time slot, these registers are set just before the pulse supplied for the operation of translator 29 and comparator 28 mentioned previously, inclusive of calls which have been reserved without servicing until the previous time due to congestion.

Read-out operation for information from memory 32 is always controlled by the order-generator 30 while the first class function is carried out at suitable intervals by joint operation of translator 29, comparator 28 and order-generator 30, and other circuits.

It is evident that the main parts of translator 29 and comparator 28 can be realized by a combinational logical circuit and the contents of order-generator 30 can be realized by a conventional sequential stepping logical circuit.

Although the example of FIGURE 7 shows a two-stage connection system, the number of stages can be extended to any number such as three, four and so forth.

Generally speaking, the controlling operation for the contacts corresponding to $Cij$ becomes the more important, the more the number of stages.

In this case, it would be possible to provide two sets of registers 24–27 so that operation may be performed in either direction for an improvement in the system such as operating the second class function prior to the preceding guard time—that is, during the operating time of the preceding time slot.

Even though high speed circuits are necessary because the memory equipment is multiplexed, the present invention is economically advantageous, since memory equipment of greatly reduced storage capacity is sufficient for securing optimum performance, and the needed accessory channel switch network is materially reduced by the variability of the time-slot allocation.

Now the foregoing descriptions of this invention may be summarized as follows:

Note that the description is made with reference to FIGURE 6 which represents a functional rearrangement of block diagram of FIGURE 3.

Referring to FIGURE 6, switching network 10′, memory 12′ and control 14′ are units having the identical functions to those denoted by the same symbols in FIGURE 3, while a combination of gate circuit 13 and pulse source 11 in FIGURE 3 has been substituted for by pulse distributing circuit 35 in FIGURE 6. 35 denotes the pulse distributing circuit for distributing switch controlling information to be sent in for each time-slot from control 14′ for sending pulses to contacts that have been actually marked. Thus circuit 35 may be deemed a combination of gating and pulse source functions. The function of control 14′ may be conveniently classified into three functions, "in" 14*a′*, "process" 14*b′* and "out" 14*c′*. The "in" portion 14*a′* receives information from memory 12′ on the status of which external circuit is connected. The "process" 14*b′* portion determines addresses of contacts within a switch to which the time slot should be assigned for each time slot. Those addresses are sent to the pulse distributing circuit 35 through the "out" portion 14*c′*.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

What is claimed is:

1. A time-division telephone exchange system for operating a multi-stage exchange network on a time-division and space-division basis characterized by comprising intermediate link means and switch means for connecting said link means; means for memorizing and storing in a memory both particular combinations of external circuits in service and connection numbers corresponding to said combinations, control means coupled to said memorizing means comprised of input terminal means for receiving information in the form of combinations of external circuits, processing means coupled to said memorizing means for allocating time slots which invariably occur repetitively with a short time duration for each call that takes place immediately before actual connections are made, said processing means including means for assigning more than one call connection during any given time slot, and output terminal means for transferring impulses representing address signals; a pulse distributing circuit coupled to said output terminal means for feeding pulses to said selected ones of said switch means to close the assigned time-division switches in the assigned time slot under control of said address signals whereby the switches to close are assigned in the switching network of the time-division telephone exchange system in such a manner that connection routes may be established only through those external circuit combinations not already in service, comparison means for comparing those external connections already in service against those connections desiring service whereby selected combinations being processed by said processing means are assigned to the same time slot appearing at the same moment only when there is no conflict in circuit combinations required by the connections desiring service and the connections in service in the said same time slot, said pulse distributing circuit including further means for supplying pulses to the switching network for causing the switches to operate in accordance with said assignment, wherein the sampling period of each call which is the microscopic connection period of two external circuits may vary about the mean sampling value so as to settle down at an equilibrium value statistically, said control means including means to permit each connection to use a number of different routes—that is, a number of different link combinations from one sampling moment to another.

2. In a time-division telephone exchange arrangement having an exchange system for effecting selected connections between subscriber lines and trunk lines through time-divisional operations, said exchange system comprising exchange network means with a system of switches through which the selected connections are made, gate circuit means having a gate circuit system connected to said network for transmitting signals to said network for selectively operating said switches, which correspond to the selected connections to be established between the subscribers of the network, pulse source means having a pulse-circuit system connected to said gate means for sending time-divisional pulses to said gate means, memory means for memorizing time-slot information corresponding to time-slots that are assigned to switches of said exchange network means, and central control means comprising first control means having a first circuit system connection to said memory means and operating means for performing first operations including identification of the calling and called party lines, the determination of the service to be performed, the testing of the items to be selected for making the call connection, and means for storing in said memory means information representing combinations of established connections corresponding to the performed tests, said control means also comprising second control means having a gate connection system through which it is connected to said gate means, and a second circuit system connection to said memory means and including determining means operating in response to said stored information for determining the contacts and other items to be used in the call connection, and also operative to transmit through said gate connection system corresponding signals to said gate means and thereby cause said network means to be actuated by said gate means through said gate circuit system for establishing the call connection in response to the signals transmitted by said second circuit system to said gate means; comparison means for comparing those established connections against those connections desiring service to inhibit the occurrence of conflicting connections during the same time slot, said comparison means including means for performing the comparison operation of all those connections desiring service against those connections already in service once during the interval between adjacent time slots.

3. Time-division multiplex switching control means for use in establishing non-conflicting connections between subscribing points in a system comprised of a plurality of points each connected to a highway link through associated first switch means and a plurality of highway links interconnected by associated second switch means, said multiplexing means comprising memory means for storing data identifying the points to be connected, type of service and status of the system links; first means for reading data out of said memory means in a predetermined manner; second means for conditioning the first and second switch means to establish the appropriate connections set forth by the data read out of memory; pulse means for enabling said first means only during a switching time slot and for disabling the first and second switch means during the guard time between adjacent switching time slots; third means for comparing the connections next to be made in a time slot with the present connection occupying the same time slot to determine if any conflicting paths occur; and fourth means responsive to said third means for delaying all those connections next to be made by at least one time slot when a conflicting status occurs such that any given connection need not occupy the same time slot during each time period.

4. The switching control means of claim 3 wherein said second means is comprised of means for storing the data read out of said memory means; plural register means associated with said first and second switch means; and translator means for coupling the output of said storage means to the appropriate register means for selectively enabling the first and second switch means.

5. The control means of claim 3 wherein said comparison means is comprised of means coupled to said plural register means and said translator means to prevent signals from said translator output from being transferred to said plural register means for at least one time slot in cases where a path conflict is noted.

6. A switching system for use in connecting subscribers serviced by a telephone network on a time-division basis comprising:

link means extending between the various subscribers serviced by the network;

each of said link means comprising switching means operative during predetermined switching periods for selectively connecting calling and called subscribers serviced by the network through said link means;

memory means for storing call information derived from a calling subscribed relating to identity of the calling and called subscribers and the status of the call;

translator means for converting said information into a prescribed switching path;

first means for sequentially transferring a plurality of said call information groups from said memory means into said translator during each guard interval occurring between periods during which said switching means are activated;

second means for receiving said switching path information to select those switch means necessary to establish said prescribed paths;

comparator means coupled to said second means for disabling those switching paths assigned during a guard interval which conflict with previously assigned switching paths set up during the same guard interval whereby those switching paths disabled during a guard interval receive path assignment priority during the next occurring guard interval.

References Cited

UNITED STATES PATENTS

| | | | |
|---|---|---|---|
| 2,935,569 | 5/1960 | Saal et al. | 179—15 |
| 3,049,593 | 8/1962 | Touraton et al. | 179—15 |
| 3,172,956 | 3/1965 | Inose et al. | 179—15 |
| 3,236,951 | 2/1966 | Yamamoto et al. | 179—15 |
| 3,424,868 | 1/1969 | Saal | 179—15 |

RICHARD MURRAY, Primary Examiner

C. R. VONHELLENS, Assistant Examiner

U.S. Cl. X.R.

178—50